United States Patent [19]

Ohnhaus

[11] Patent Number: 4,807,667

[45] Date of Patent: Feb. 28, 1989

[54] CONVERTIBLE SHAPE HOOD STRUCTURE FOR AIR FLOW MEASUREMENT

[76] Inventor: Buford U. Ohnhaus, 9925 Lorelei La. NE., Albuquerque, N. Mex. 87111

[21] Appl. No.: 867,772

[22] Filed: May 28, 1986

[51] Int. Cl.⁴ ............................................. G01F 1/40
[52] U.S. Cl. ....................................... 138/45; 16/347; 78/861.62
[58] Field of Search ............... 16/225, 235, 319, 346, 16/347, 348, 369, 370, 371, 374; 73/861.62; 138/37, 39, 45, 109, 119, 178; 248/99, 101

[56] References Cited

U.S. PATENT DOCUMENTS

| | | | |
|---|---|---|---|
| 938,638 | 11/1909 | Caldwell | 16/319 X |
| 1,054,221 | 2/1913 | Loranger | 16/319 |
| 1,515,466 | 11/1924 | Dore | 16/348 X |
| 2,441,318 | 5/1948 | Harbison | 16/347 |
| 2,608,337 | 8/1952 | Nehler | 16/347 X |
| 3,222,437 | 12/1965 | Schilling | 16/225 X |
| 4,231,253 | 11/1980 | Ohnhaus et al. | 73/861.62 |

Primary Examiner—Mark J. Thronson
Attorney, Agent, or Firm—Frishauf, Holtz, Goodman & Woodward

[57] ABSTRACT

A hood structure for air flow measurements on ceiling registers is erected on a fixed square bottom base with an adjustable curtained aperture and mounting for an air flow meter. A hood skirt is stretched by means of four struts that fit against the upper rim to which the skirt is attached (as well as to the base). The rim is made of rigid strips connected together in a ring by securable pivot joints, so that the open top of the hood can have square, round or various elongated shapes for better fitting to a ceiling register or orifice. This enables the use of a smaller bottom frame than would otherwise be necessary for measuring flow out of elongated narrow registers. All but two joints are preferably equipped with pivoted forked braces for securing the angular adjustment of hinged joints connecting angle-bar rim segments by clamping the forked end. The completely removable struts are flexible enough so that the rim may be brought fairly close to the base, by means of a twist, for passing the structure through a narrow doorway without removing the struts.

20 Claims, 6 Drawing Sheets

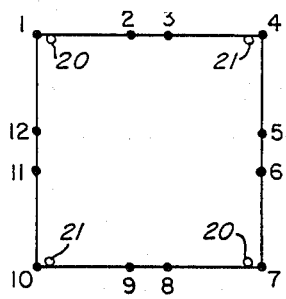
Fig. 7
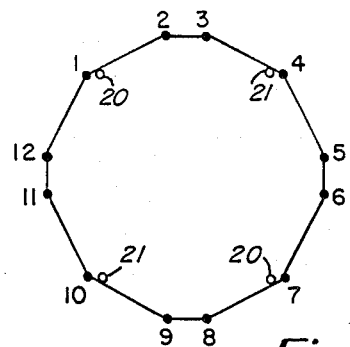
Fig. 13
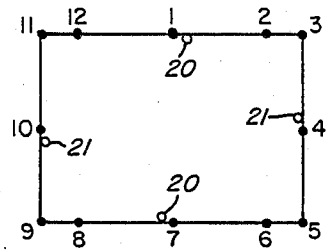
Fig. 8
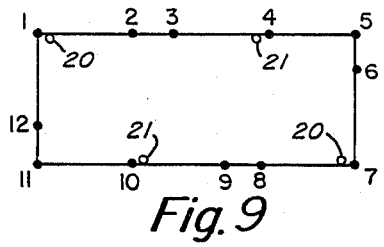
Fig. 9
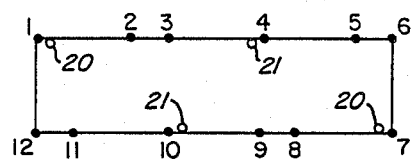
Fig. 10
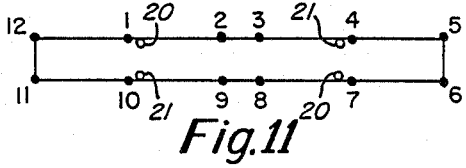
Fig. 11
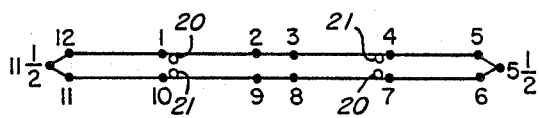
Fig. 12
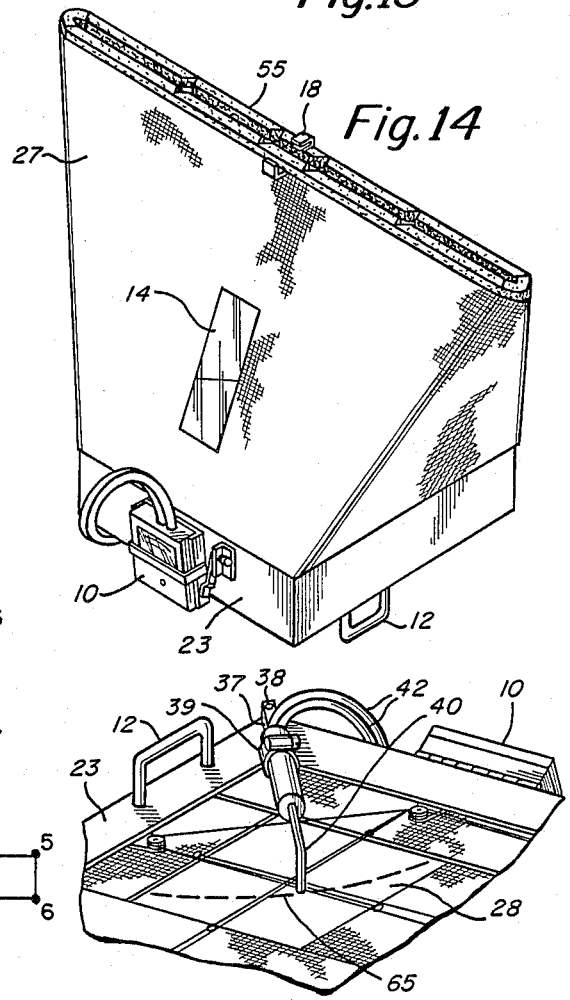
Fig. 14
Fig. 17

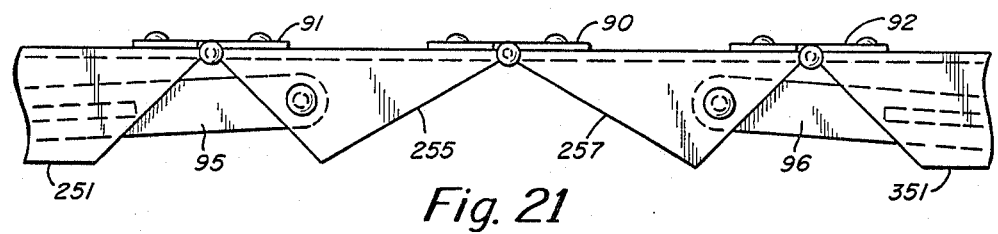
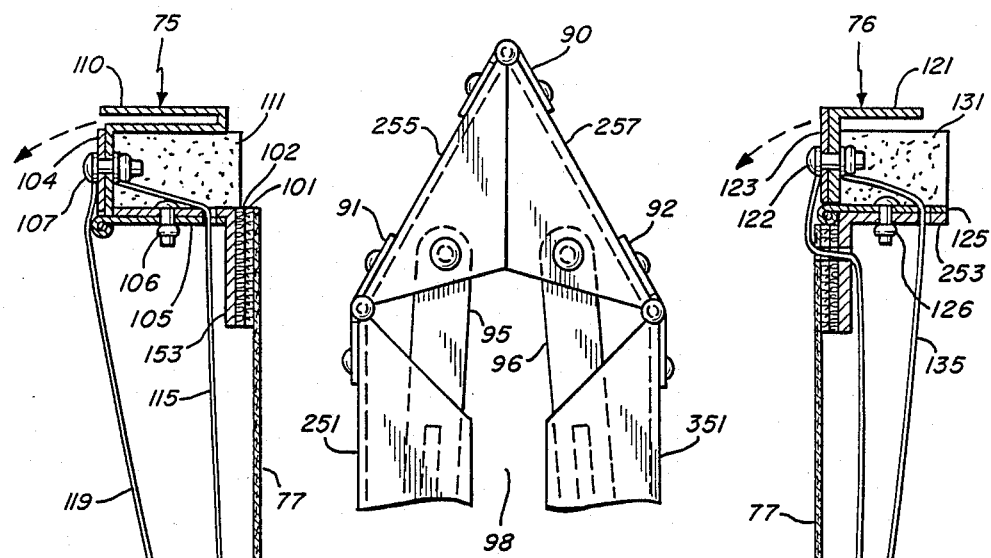
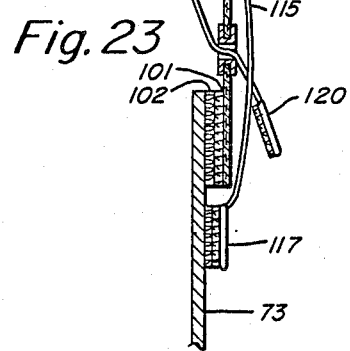
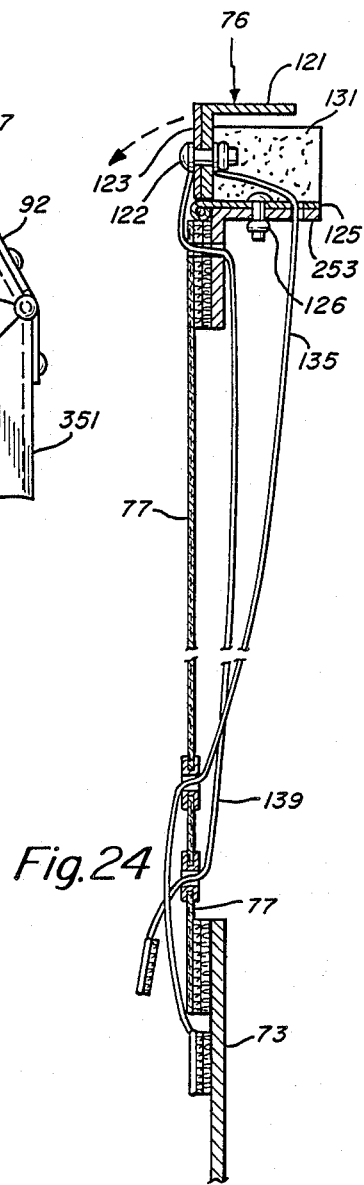

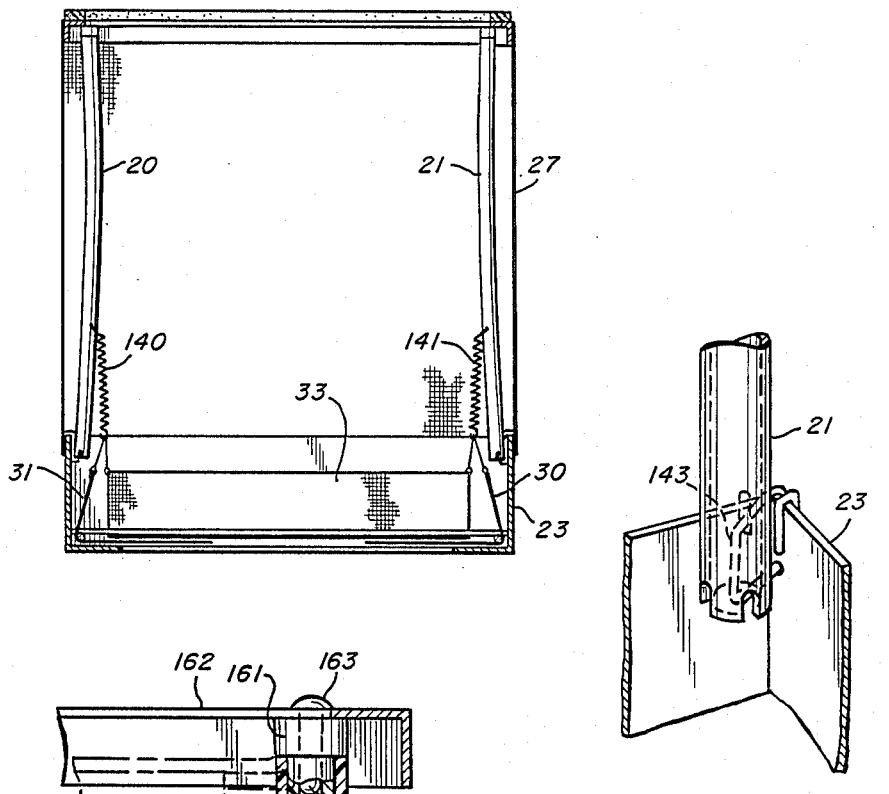
Fig. 25
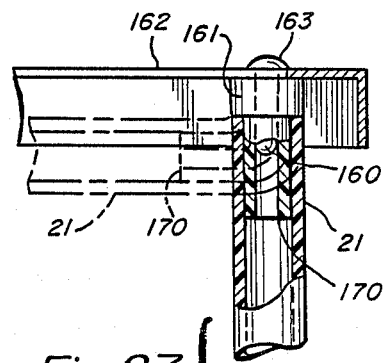
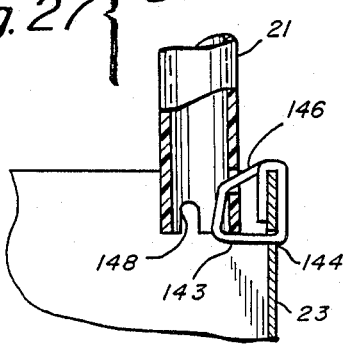
Fig. 27
Fig. 26
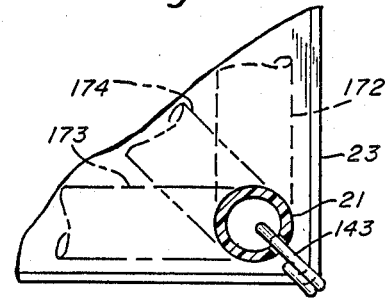
Fig. 28

CONVERTIBLE SHAPE HOOD STRUCTURE FOR AIR FLOW MEASUREMENT

This invention concerns a hood structure carrying an air flow meter and designed to be placed against a ceiling where there is a ventilation register for cooling air, for measuring the flow of air through the register. Such devices previously used have a box-like shape, contain movable curtains for adjusting the size of the opening where the air flow meter is located and are of light construction since they must be held overhead to place them in position. They are usually capable of being folded up for storage or transportation.

Such a device is shown in U.S. Pat. No. 4,231,253. The device there shown has a square frame on the bottom and a folding hood extending upward therefrom to a square opening for fitting against a ceiling.

It has a mechanism in the bottom frame for pulling two pairs of curtains simultaneously together or apart to set the size of a square opening in the middle of a bottom frame. The hood is of sheet materials such as treated cloth and is supported b a structure consisting of vertical rods at each corner of the bottom frame and a square rim at the top. The vertical rods are articulated in their midportions and their upper members have baffles or vanes hinged to them which can be extended diagonally towards the center of the hood and looked together there to counteract whirling of the air inside the hood.

Although the device just described has proved effective for making air measurements, and folds into a compact carrying package as shown in FIGS. 14-17 of U.S. Pat. No. 4,231,253, it needs to be folded in order to pass through some doorways in going from one room to another in most buildings and it needs to be bulky because the fixed aperture at the top must be able to gather the air from an orifice of any particular shape, whether elongated, square or round.

SUMMARY OF THE INVENTION

It is an object of the present invention to provide a hood structure of convertible shape so that the opening at the top that fits against the ceiling can be changed in its perimeter shape from square or round to elongated shape and provide a transistion from such shape to a bottom frame of fixed shape carrying the air flow meter and the curtain mechanism for adjusting the size of the aperture in which the sensor end of the air flow meter is mounted. It is a further object of the invention to provide a flexibility for the hood structure that will allow the hood structure to be distorted in shape to bring the bottom frame and a top rim or frame closer together without fully packing up the hood, so that it can be more quickly restored to an operating shape once it has passed through a narrow passage in somewhat deformed shape.

Briefly, the upper frame forming the rim of the hood that is fitted against the ceiling in normal use is made up of at least six pairs of opposite equal segments connected together in a ring by securable pivot joints. It is particularly desirable for one of the shapes in which the upper frame can be shaped by adjusting and securing the pivot joints to be a square substantially the same as the square shape of the lower frame, while other available shapes include rectangular shapes with varying degrees of elongation, as well as a shape approximating a round shape. The vertical members, instead of being fastened to the upper and lower frames and being capable of being folded in the middle for folding the entire device, are in the form of removable struts bearing against the corners of the bottom frame and also against the top frame and held in place at least in part by the pulling together of top and bottom frames by the flexible material of the hood skirt. These struts are stiff enough to maintain the spacing between the two frames in handling the erected hood, putting it in place against the ceiling and making measurements when it is in place, and flexible enough to permit the hood to be deformed by twisting the top frame with respect to the bottom frame and bringing the two frames nearer together for easier passage through doorways and the like. They have enough resilience to enable the hood to be put back quickly into its previous shape after release of the deforming force. Finally, to counteract any tendency of the air in the hood to swirl, a web is stretched between two of the vertical struts at opposite sides of the hood. Cloth material, supported by stretched elastic bands to form and support this web, allows flexibility when the top frame is adjusted to any configuration, as well as contributing lightness of weight to the structure.

The segments of the convertible shape top frame of the hood structure preferably comprise eight segments of equal size disposed in the ring in connected pairs, a pair being separated from the next connected pair, in each case, by at least one segment of smaller size. In the simplest case, there are just four smaller segments of equal size, each one separating two pairs of the larger segments, and the smaller segments are of a length between 25% and 50% of the length of the larger segments, a 40% ratio being most preferred. In order to be able to deform the upper aperture into a narrow slit, the small segments of one opposite pair preferably are each replaced by two half segments of half that size, joined by a pivot joint, so that the ring of segments is then made up of seven opposite pairs of equal segments, four of them the largest size, two of them of the intermediate size, and four of the smallest size which is exactly half of the intermediate size.

In a preferred embodiment of the convertible-shape rim for the hood structure, the rigid segments connected in a ring so as to pivot at their junctions are made of pieces of angle bar with hinges to connect segment ends fastened to the angle bar flanges which are directed parallel to the axis of the hood, while flanges perpendicular to the axis of the hood have their ends cut at an angle for limiting the folding end of the segments at the hinge. All, or all but one pair of hinge joints are equipped with a brace pivoted on one segment and having a slot at its extremity for clamping the brace by tightening a bolt or similar fastening on the adjoining segment.

A clear plastic window is provided, preferably on the side of the structure on which the indicator dial of the air flow meter is mounted, to enable the user to check that the antiswirl web is properly disposed inside the hood when the hood is erected. This can also be used for viewing an attaching clip at the far side of the rim of the hood, when the hood is raised to be clipped onto a ceiling ventilating fixture to help hold it in place.

BRIEF DESCRIPTION OF THE DRAWINGS

The invention is further described by way of illustrative example with reference to the annexed drawing, in which:

FIG. 7 is a diagram of the top frame or rim of the hood structure as set up in square configuration;

FIG. 8 is a diagram of a first oblong configuration of the hood rim illustrated in FIG. 7;

FIG. 9 is a diagram of a second oblong configuration of the hood rim of FIG. 7;

FIG. 10 is a third elongated configuration of the hood rim of FIG. 7;

FIG. 11 is a diagram of a fourth elongated rectangular configuration of the hood rim of FIG. 7;

FIG. 12, is a diagram of a slit configuration of the hood rim of FIG. 7;

FIG. 13 is a diagram of an approximately circular configuration of the hood rim of FIG. 7;

FIG. 14 is a perspective view of the hood configuration having the rim configuration of FIG. 11;

FIG. 17, on the same sheet as FIGS. 7–14, is a perspective view of a portion of the hood structure, in inverted position for showing a preferred disposition of the air flow meter.

FIG. 21 is a detail in top view of the three hinged joints between the segments 251, 255, 257 and 351 shown in FIG. 18;

FIG. 22 is a view of the same portion of the rim shown in FIG. 21 when the center hinge is folded together as far as possible to produce the configuration symbolically shown in FIG. 12;

FIG. 23 is a cross-section showing the construction and manner of control of the attachment clip 75 of FIG. 18;

FIG. 24 is a cross-section showing the construction and the manner of control of the attachment clip 76 of FIG. 18;

FIG. 25 is a diagram in a side elevation seen from the inside of the hood structure showing the position of the support struts in the configuration of FIG. 4;

FIG. 26 is an isometric view of the bottom fastening of a support strut near a corner of the bottom frame that carries the curtains of the hood structure;

FIG. 27 is a cross-section showing the top and bottom positioning for a support strut in the embodiment illustrated in FIGS. 25 and 26, and FIG. 28 is a top view of a corner of the bottom frame, showing a support strut in a section at the level where the fastening clip passes through its wall, showing alternate positions of the support strut when the hood structure is folded up and omitting, in the drawing, the skirt, curtains, etc.

DESCRIPTION OF THE ILLUSTRATED EMBODIMENTS

Figure 1:
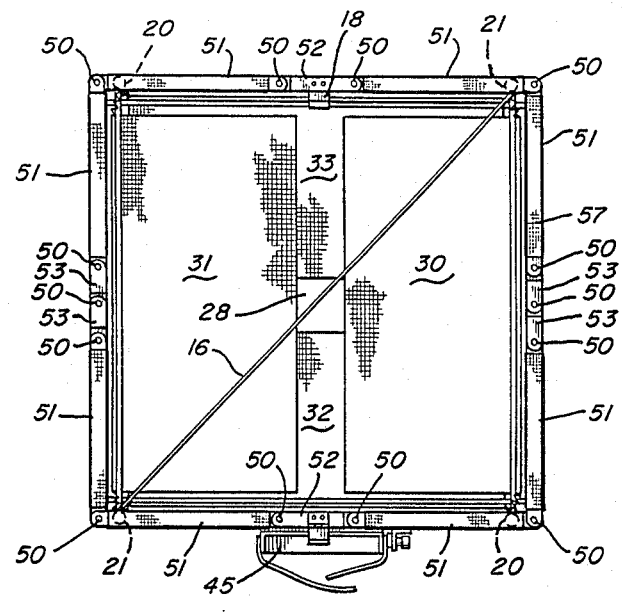
FIG. 1 is a top view of the hood structure of the invention, set in a square-tube shape and having the curtains adjusted for minimum aperture.
Figure 2:
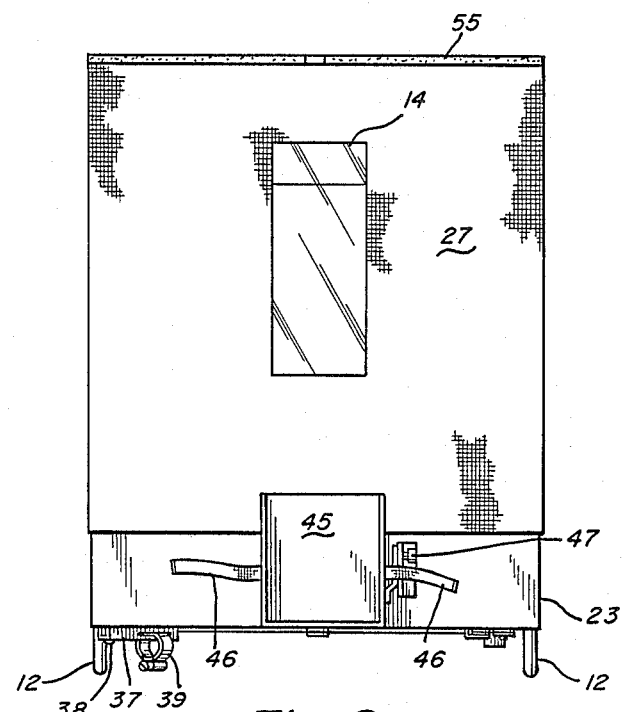
FIG. 2 is a side elevation of the hood structure of FIG. 1.
Figure 3:
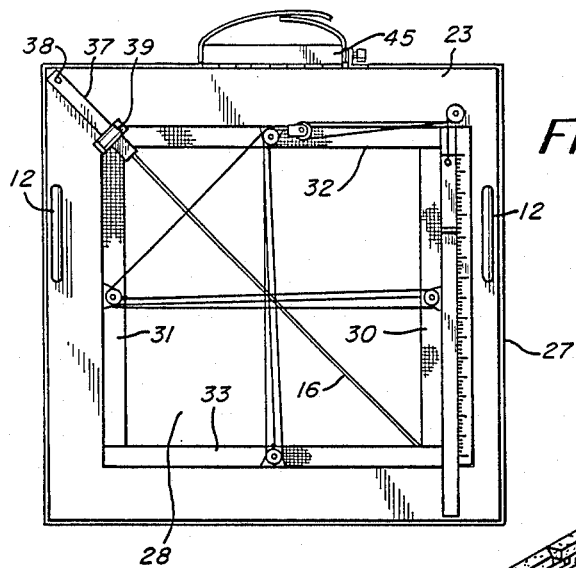
FIG. 3 is a bottom view of the hood structure of FIG. 1 with the curtains adjusted for maximum aperture.

FIGS. 1, 2 and 3 are top, side and bottom views of a hood structure according to the invention in which the upper frame or rim is adjusted and secured in a square configuration corresponding to that of the lower fixed frame.

Figure 4:
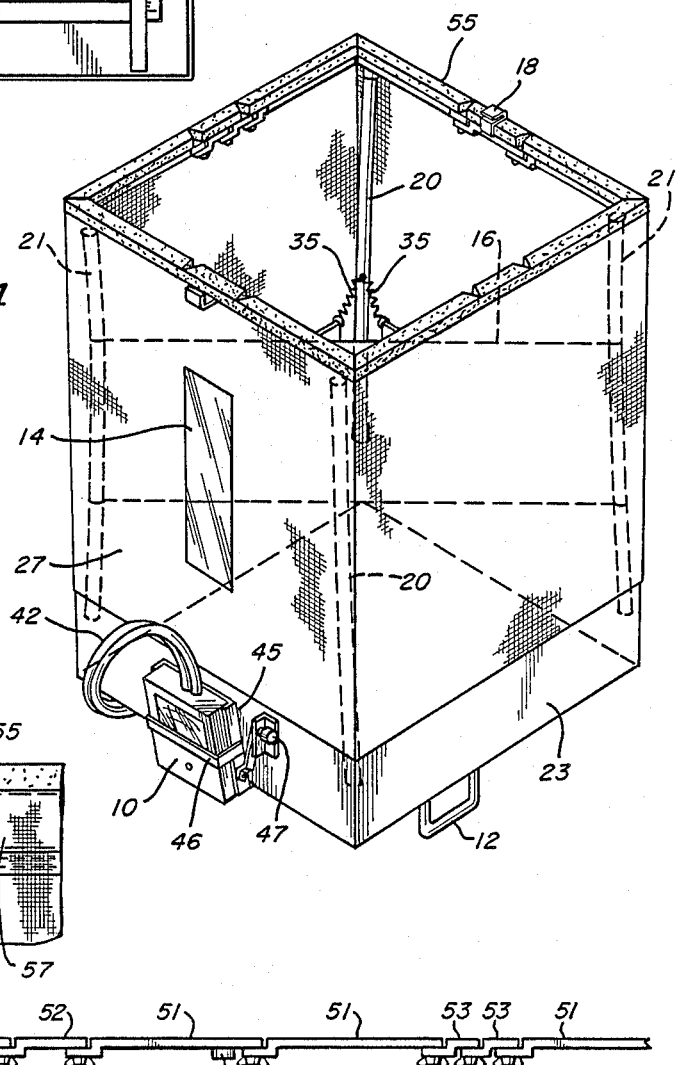
FIG. 4 is a perpsective view of the hood structure in an attitude such as it would have when pressed against the ceiling for measurement of air flow out of a register in the ceiling.

FIG. 4 shows the same embodiment in perspective view from above one of the front corners, with the difference that an air flow meter 10 is shown mounted on the front where a person holding the hood structure in position by means of the handles 12 could read the meter. FIG. 4 also shows a clear plastic window 14 by which a person putting the hood structure in position can observe the proper disposition of the web 16 inside the hood as well as the engagement of the clip 18 against a T-bar of a tiled ceiling or some other feature serving the purpose of facilitating the placing of an air flow measuring hood. The foam strip 55 is shown attached in segments to the frame rim, where it serves to seal the hood against the ceiling portions adjacent to an orifice being tested. FIG. 4 also shows plainly one of the struts 20 which is slipped into place for erecting the hood structure and is of a size for being stored diagonally against the bottom of the hood when the hood is collapsed for storage. FIG. 1 merely shows the position of the two struts 20 and the two struts 21, the latter two carrying the anti-swirl web 16. The struts 20 fit on clip supports or other emplacements (not shown) of the bottom frame 23 which are located just inside the corners of the frame and are slipped into semicircular receptacles 25 shown in FIG. 5 or onto locating pins shown in FIG. 27, in each case held by the rim, where the struts are held by the tension of the skirt 27, which is put under slight tension when the four struts 20 are put in place.

FIG. 1 also shows the four curtains that are operated together to adjust the size of the aperture 28 for which the control mechanism is mounted on the bottom frame 23 as roughly indicated in FIG. 3. FIG. 1 illustrates an aperture which is of preferred minimum size, namely 0.06 sq. ft. (8.64 sq. in., a little less than 3 in. on a side). The curtains consists of two side curtains 30 and 31 and front and back curtains 32 and 33.

FIG. 3 shows the aperture 28 at its preferred maximum opening of 1.8 sq. ft., about 260 sq. in. or slightly more than 16 in. on a side. The curtain-drawing mechanism consists of cords and pulleys, the manner of operation of which is fully described in the above-mentioned U.S. Pat. No. 4,231,253, and therefore does not need to be described further here. A pair of springs against which the draw cords work is visible at 35 in FIG. 4, being hooked onto the strut 20 when the hood structure is erected. FIG. 3 also shows the swinging arm 37 pivoted at 38 on a corner of the frame 23 and holding a clamp 39 for mounting the sensor portion 40 (FIG. 17) of the air flow meter which is connected by flexible tubes 42 to the indicating portion 10 of the air flow meter.

FIG. 2 shows a mounting panel 45 for holding the air flow indicator 10 by means of friction straps 46 which is hinged to the bottom so that it can be tilted down for easier viewing when the hood structure is above eye level and fixed in position by the clamping knob 47.

Figure 6:
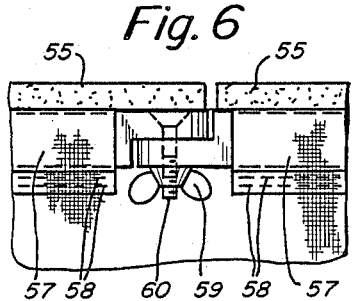
FIG. 6 is a detail, in edge view, from the inside of the hood structure of a pivot joint shown in FIG. 5, showing the foam strip and the attachment of the hood's skirt.
Figure 5:
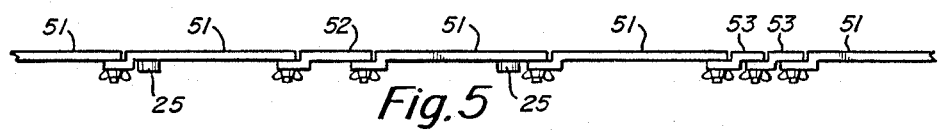
FIG. 5 is an edge view of part of the articulated members of the ring forming the convertible shape rim of the hood structure of FIG. 1, stretched out in a straight line, omitting the resilient foam strip on its top surface, in a simple first embodiment of pivot jointing of ring members.

As already mentioned, the upper frame or rim has a resilient foam strip applied on the top surface of each of the articulated members that make up the rim, but this strip has been shown removed in FIG. 1 so that the pivot joints 50 may be seen. FIG. 5 shows a stretched out section of the rim, likewise with the foam strip removed for simplification of the representation. FIG. 6 is a detail of one of the pivot joints of the kind shown in FIG. 5.

FIG. 1 illustrates a typical embodiment of the preferred length ratios for the articulated rigid strip members that make up the convertible shape rim that are connected in a ring, namely, eight members 51 of the largest length, all of them for example having a length between pivot centers of 10 inches, two members 52 of intermediate length, for example 4 inches between pivot centers and four members 53 of the smallest length, for example 2 inches between pivot centers. When disposed in a square, or in a symmetrical rounded configuration such as shown in FIG. 13, each member 51, 52 or 53 is opposite another member of the sam length.

FIG. 5 shows how the members are arranged to present a flat-topped surface all around the rim, on which pieces of resilient foam strip are adhesively attached. FIG. 5 shows the members stepped both on top and bottom where needed to make a joint with a plain end of another member, but that is, of course, not necessary, although it makes for reduced weight. FIG. 6 shows a variation in which both of the joined ends are stepped to reduce the thickness to one half the usual thickness just at the pivot joint. The thickness is somewhat exaggerated in FIG. 6. FIG. 6 also shows the cloth of the skirt lapped over the rim at 57 and sewed down at 58, as well as a wing nut 59 for tightening a pivot joint. The screw 60 can be keyed at the top, as by a countersunk square head (not shown) so that the joint can be tightened or loosened simply by turning the wing nut. FIG. 6 also shows the foam strip 55 adhesively attached to the frame rim.

FIGS. 7 to 13 show how the same ring of straight segments 51, 52 and 53 shown in FIG. 1 can be tightened into seven particularly useful configurations, the segments 51, 52 and 53 having, for example, the same length mentioned by way of example for FIG. 1. FIG. 7 is the configuration of FIG. 1 shown symbolically like the others. FIGS. 8–11 are various oblong configurations and FIG. 12 shows how a narrow slot can be obtained. In FIGS. 7–11 the pivoting points between points 2 and 3 and between points 8 and 9, which appear in FIG. 12 (and in FIG. 1) are omitted to simplify the diagrams. The approximately circular configuration of FIG. 13 has a diameter of about 29 inches.

The slot configuration of FIG. 12 can be as little ¼ in. wide and about 46 in. long for measuring air going into or out of a narrow crack. For measuring most slot-type ventilators, however, a configuration like FIG. 11 is more certain to cover the entire orifice . FIG. 14 is a perspective view of the hood structure of FIG. 1 set in a configuration corresponding to FIG. 11.

Figure 15:
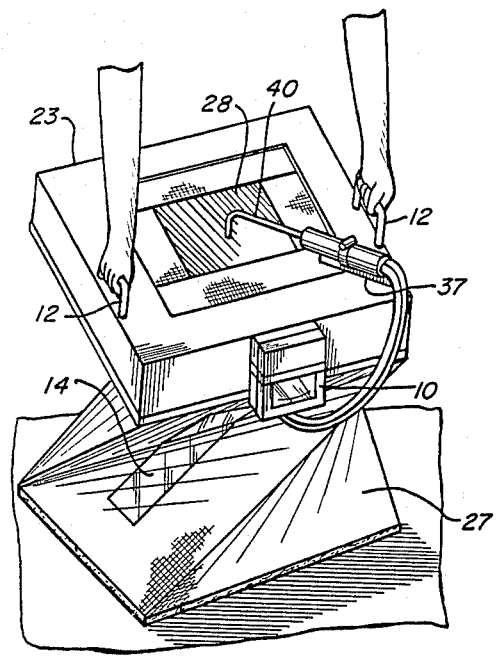
FIG. 15 is a simplified perspective view that illustrates the beginning of a distortion of the hood structure for facilitating its passage through the doorway.
Figure 16:
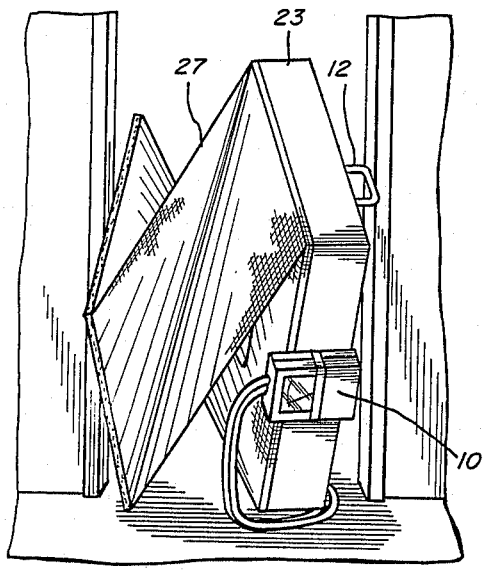
FIG. 16 is a simplified perspective view of the hood as deformed for passing through a narrow doorway.

FIGS. 15 and 16 illustrate the advantage of the somewhat flexible plastic struts 20 and 21, which permit the hood structure to be partially folded down without removing the struts from position for carrying the hood structure from one room to another in a building and passing it through a passage that may be only 14 in. wide, in the case of the hood structure of the dimensions mentioned above by way of example.

FIG. 15 shows the first step in folding down the hood structure with a twisting motion, with the structure put upside down on the floor, in whatever configuration the open rim may be, and then steadying the part against the floor by a slight downward pressure while the frame 23 is twisted (as shown by the relative position of the meter indicator 10 and the window 14 in FIG. 15). FIG. 16 shows the hood structure as twisted far enough down for passing through narrow doorways. It is not necessary to get the rim and the frame 23 into parallelism for this kind of transportation, although it usually carries well that way, but when put down in a narrow passage, it will spread out to some random configuration such as the one shown in FIG. 16.

When the structure is brought into the next working location, it can readily be untwisted so that it will hold itself in its normal distended shape directed by the struts and quickly put against the ceiling for another measurement.

FIG. 17, shown below FIG. 14, is a detail of the mounting of the sensor portion 40 of the air flow meter on the lower frame 23, with the hood structure shown upside down for this purpose. For this detail, a similar showing of the air flow meter appears in the view of the partially folded hood structure in FIG. 15 where, again, the hood structure is upside down. FIG. 17 shows how the holder 37 on which the sensor 40 is clamped by the clamp 39 can be swung so that the tip of the sensor 40 can move over the arc 65 so as to measure the air flow velocity distribution over the aperture, in order to check how normal that distribution might be in a particular case.

It will be recognized that variations and modifications are possible, by varying the ratios of the length of the segments of the rim, the number of pairs of segments, the seating of the struts 20 and 21, or otherwise. For example, a crossweb may be sewed to the middle of the web 16 and anchor it for stretching on the struts 20. In some cases it may even be worth while to provide another strut or two, although the illustrated configuration is particularly preferred.

The illustrated air flow meter is an instrument commercially of the 6000 series sold under the trademark "Alnor". A variety of air flow meters is of course available and the holder 45 as well as the swinging mount 37 may be appropriately modified to fit the different meter and interchangeable holders and swinging mounts may be made available for different meters.

It is hardly necessary to mention that the hood structure can be essentially completely packed into the bottom frame 23 after the struts are laid diagonally on the inside of the bottom of the frame. The rim can have enough of its pivot joints loosened so that the skirt will pack well and it is not even necessary to make the skirt detachable from the rim.

FIGS. 18–28 describe a preferred mode of construction of a hood structure described above.

Figure 18:
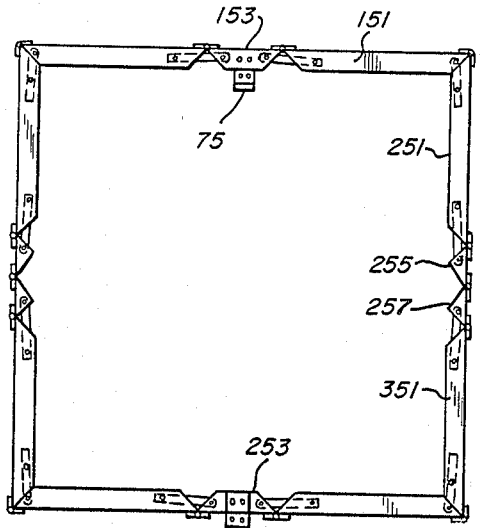
FIG. 18 is a schematic top view corresponding in configuration to FIG. 1, showing a preferred construction for the convertible-shape rim of the hood structure of the invention.

In order to simplify the showing of the structure of the convertible-shape rim of preferred construction for the hood structure of the invention, FIG. 18 shows the rim in top view, in a manner similar to FIG. 1, but omitting the showing of other parts of the hood structure, such as struts, curtains and anti-swirl barrier web. The clips 75 and 76 will be described with reference to FIGS. 24 and 25. The rest of what is shown in FIG. 18 will be readily understood from FIGS. 19-22.

Figure 19:
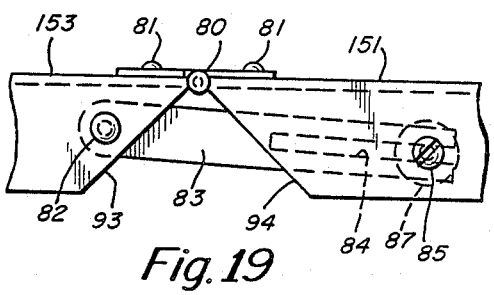
FIG. 19 is a detail, in top view, of the hinge between the segments 153 and 151 shown in FIG. 18.

FIG. 19 shows the hinge between the segments 153 and 151 shown in FIG. 18. FIG. 19 shows a top view corresponding to FIG. 18 and FIG. 20 shows a side elevation seen from inside the rim.

Figure 20:
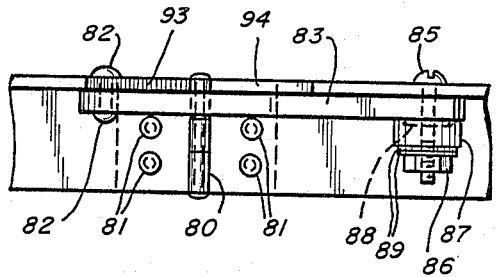
FIG. 20 is a side elevation viewing the structure illustrated in FIG. 19 from the inside of the hood structure.

It can be seen from FIGS. 19 and 20 that the segments of the rim shown in FIG. 18 are sections of angle bars such as may be extruded or otherwise fabricated. Aluminum extrusions are convenient for their light weight.

A hinge 80 is riveted to the angle bars 151 and 153 by pop rivets 81. Another pop rivet 82 provides a pivot for a forked tongue 83 having a slot 84 through which a bolt 85 passes.

The bolt 85 can be tightened with a screwdriver against a nut 86 to clamp the hinged joint in any of its possible positions, of which FIG. 19 is one extreme and the other extreme is a right-angled configuration in which the edges 93 and 94 come together. A hard rubber compression washer 87, a small metal washer 88 between it and the tongue 83 and two somewhat larger washers 89 are provided on the bolt 85 between the tongue 83 and the nut 86.

The hinged joints at the corners of the configuration shown in FIG. 18, as for example between the two long segments 151 and 251, is of the same kind as the joint shown in FIGS. 19 and 20. These joints at the corners are shown in FIG. 18 in the extreme right-angled joint position referred to above.

FIG. 21 is a view like FIG. 19 of the three hinged joints in the sequence of connections between the segments 251, 255, 257 and 351. FIG. 21 shows these hinged joints in their extended position. The joined segments are all made from the same kind of angle bar as the segments 151 and 153 illustrated in FIGS. 19 and 20, but the horizontal parts of the segments 255 and 257 are triangular because of the shortness of these segments and the fact that the segments 255 and 257 are designed to fold together at an acute angle as shown in FIG. 22. Furthermore, the hinge member 90 does not have an adjustable clamp. It is practically always used in one or the other of its extreme positions and can readily be made to hold either of those extreme positions well enough by friction.

The hinges 91 and 92 are provided with clamping tongues 95 and 96 which are held in the same way as the tongue 83 of FIGS. 19 and 20.

FIG. 22 shows the other extreme position of the hinge 90, in which the edges of the segments 255 and 257 come together and the segments 251 and 351 are brought into parallel positions. In the case of a structure of the preferred dimensions referred to in connection with FIGS. 7-13, the gap 98 between the segments 251 and 351, for example, can be just one half inch, producing a configuration corresponding to FIG. 13.

In connection with FIGS. 18-22 it is, again, to be understood that compressible gasket material is cemented to the top of the rim, as mentioned in connection with FIG. 1 and illustrated in FIG. 6.

FIG. 23 shows not only the construction of clip 75 of FIG. 18 but also the manner in which the skirt 77 of the hood is attached to the rim illustrated in FIG. 18 and to the bottom frame or pan 73, corresponding to the frame 23 of FIG. 4.

The skirt 77 is fastened by engaging hook and eye ribbons 101 and 102 of the kind sold under the trademark Velcro.

To provide the clip 75 a hinge 104,105 is riveted by rivet 106 to the horizontal part of the angle bar segment 153 of the convertible-shape rim. The clip piece 110 is designed to be pushed onto the horizontal flange (not shown) of a T-bar that holds ceiling tiles in place, the upper lip of the clip piece 110 being inserted between the T-bar flange and a ceiling tile. The compressible foam gasket 111 is shown in this case, since it affects the shape of the clip. The clip piece 110 is riveted to the hinge member 104 by means of another pop rivet 107.

When the clip 75 is not used, which is to say when the hood structure is simply pushed against the ceiling around a register or other ventilation orifice, the hinge 104, 105 is operated to swing the clip 75 down inside the rim, so that the clip will not stick up above the rim.

The clip 75 is maintained in the position shown in FIG. 23 by a cord 115 which passes through a hole in the rim segment 153 and the hinge part 105 and continues inside the hood to a place near the frame 73 where it passes through an eyelet 116 to make a hook and eye material fastening to the frame 73 by means of the hook material tab 117. The clip 75 can be erected in that position by means of the cord 115. Another cord 119, connected to the swinging portion of the clip structure (both the cords 115 and 119 can conveniently be connected at the location of the pop rivet 107) enables pulling down of the clip 75 into its inactive position inside the rim by pulling on the hook material tab 120.

FIG. 24 similarly shows the clip 76. In this case, the clip piece 121 is riveted by the pop rivet 122 to the hinge part 123 and, since it faces towards the outside of the hood, can be made somewhat more simply than the clip part 110 of the clip 75. Hinge part 125 is riveted to the horizontal part of the angle bar segment 253 by a pop rivet 126. The clip 76 is maintained in the position shown in FIG. 24 by a cord 135 which passes through a hole in the rim segment 253 and continues inside the hood to pass through an eyelet near the frame 73 similar to the cord arrangement 115 of FIG. 123. Another cord 139 enables the clip 76 to be pivoted in the direction of the arrow in FIG. 24. The cords are respectively attached at opposite ends of the pop rivet 122. The gasket 131, like the gasket 111 of FIG. 25, is part of a series of gaskets located on top of each segment of the rim shown in FIG. 18, but omitted previously for simplicity of explanation. The gaskets present a more or less continuous outer surface, so that the hood structure can be fairly well sealed against the ceiling. The gasket is briefly interrupted or cut away to make space for the cord 115.

After the clips 75 and 76 have been put near their operating positions shown in FIGS. 23 and 24, the clip 75 is first put into place onto a T-bar flange of the ceiling by turning and pulling the hood structure until the clip is secured to the T-bar. Then the opposite side of the hood structure is raised with the clip 76 not quite in the position shown in FIG. 24 and the cord 135 is pulled to bring the clip over the T-bar flange, after which the cord is secured.

The features of the preferred form of convertible-shape rim for a hood structure can be summarized as follows in view of the details explained above with reference to FIGS. 18–22. The rigid segments connected in a ring so as to pivot at their junctions are made of pieces of angle bar with hinges to connect segment ends fastened to the angle bar flanges which are directed parallel to the axis of the hood, while the flanges perpendicular to the axis of the hood have their ends cut at an angle for limiting the folding end of the segments at the hinge. All, or all but one pair of hinge joints are equipped with a brace pivoted on one segment and having a slot at its extremity for clamping the brace by tightening a bolt or similar fastening on the adjoining segment. This is greatly superior for holding the shape to the simply tightenable pivot illustrated in FIGS. 5 and 6. In the configurations of FIGS. 8–12, all of the hinge joints would be provided with adjustable braces of the preferred type. FIG. 18 corresponds to the configuration symbolically shown in FIG. 7, with an additional hinged joint to make possible the provision of a narrow slot opening. The shortness of the segments joined by the additional hinged joint in this case, and also the fact that the hinge closes to an angle considerably less than 90 degrees to provide the narrow slot shown in FIG. 22, make it impractical to provide an adjustable clamp brace for these two additional hinges, but it has been found in practice that if all the other joints are clamped, there is no instability in shape produced by the unclamped pair of hinge joints.

The compressible gasket provided on the top surface of the angle bar segments of course must have holes, for adjusting the screws for tightening the hinge joint braces, (which have not been illustrated in the drawings).

This type of adjustable rim for a hood structure also lends itself well for mounting controllable clips on the rim structure at two points of the rim just above the compressible gasket as illustrated in FIGS. 23 and 24.

It is conceivable that the preferred rim structure would be useful for hoods and flexible duct sections for a variety of purposes other than measurement with a flow meter and a curtained aperture for the flow meter as shown in FIGS. 1–4.

FIGS. 25–28 show additional details regarding the mounting of the struts 20 and 21 shown in FIGS. 1 and 4. These figures assume that the rim of the hood structure is of the kind illustrated in FIGS. 18–22.

FIG. 25 is a view of one side of the hood structure from the inside when the rim is in the configuration shown in FIG. 18. In FIG. 25, the connection of the web 16 to the strut 21 has been omitted to simplify the drawing. The attachment, by springs 140 and 141 to the back corners of the curtains 30, 31 and 33 is shown, a single spring 140 or 141 being used instead of the two springs 35 illustrated in FIG. 4. FIG. 25 is basically a diagram so that the detailed views regarding the securing of the ends of the struts 20 and 21 are given in FIGS. 26–28 will be meaningful.

FIG. 26 shows the bottom of the strut 21 in the upper part of a corner of the aperture frame 23 which carries the curtains 30–33. The clip by which the bottom of the strut 21 is fastened is not visible in this view and is roughly indicated in broken lines at 143.

FIG. 27 shows, partly in section, the bottom and the top of the strut 21 and in the lower part of the figure clearly shows the clip 143, which is secured by two turns on the frame 23, passes through a perforation in the frame and has an end 146 which passes through a perforation near the bottom of the strut 21 and then is bent over the frame 23. The bottom of the strut 21 also has notches 148 to allow the strut to rotate when laid down horizontally within the frame 23 for storage of the hood structure in collapsed form. This allows the strut to remain attached to the frame 23 by the clip while eliminating distortion of the support clip and stress on the perforation in the strut through which its free end passes.

The top of the strut 21 is held in place by a pin 160 and a short length of flexible tubing 170 which slips inside the hollow strut 21. A spacer 161 is provided between the top of the strut 21 and a horizontal flange of the angle segment 162. The gasket on the top of the segment 162 has again been omitted, this time to show the head 163 of the pin 160. No attempt has been made in FIG. 27 to show the hinge and clamping brace provided at the corner of the rim adjacent to the location of the pin 160 at the top of the strut 21, nor to show the skirt 27 of the hood, in order to simplify the drawing.

When the hood is twisted and collapsed as in FIG. 16, the flexible tubing allows the strut 21 to fold as into a position shown by phantom lines so that the strut can be packed within the frame 23 without disengaging it from the pin 160.

FIG. 28 illustrates the different ways in which the struts can be packed horizontally when the hood structure is collapsed by dislodging one end of the struts from the flexible tubing 170. When the struts 20 and 21 are somewhat shorter than the sides of the frame 23, they can be laid down for storage along one side as shown in the broken lines 172 or the chain dotted lines 173. When the dimension of the hood in the direction of flow air through the hood is greater than one side of the frame 23, it may be necessary to lay the struts down diagonally as illustrated in the double dotted chain lines 174.

Although the invention has been described with reference to particular illustrative embodiment, it will be understood that variations and modifications are possible within the inventive concept.

I claim:

1. Portable convertible-shape hood structure for collecting and guiding an air flow to be measured, comprising a first frame of quadrangular shape defining a first end of said hood structure, adjustable aperture defining means carried on said first frame, including four curtains arranged in two oppositely located pairs respectively having aperture-defining portions partially overlapping each other which are mutually parallel, the pairs being disposed at right angles to each other and the curtains of each pair being capable of being drawn towards or away from each other respectively for narrowing and widening a an aperture of said hood structure defined by them, a mechanism mounted on said first frame for simultaneously drawing together or apart the curtains of both said pairs of curtains to determine the size of said aperture and for indicating the size of said aperture, means for supporting a flow-sensing part of an air flow meter at an adjustable location in said aperture and further comprising, in accordance with the invention:

a convertible-shaped hood of flexible sheet material constituted as a tubular skin with one open end thereof secured to said first frame and having fastened thereto, at the other end thereof, an articulated second frame defining an open second end of said hood structure, said second frame having at least six pairs of opposite equal segments, said segments being connected in a ring by tightenable pivot joints so that a second aperture defined by said second frame may be set in any of a variety of polygonal shapes while presenting a flat rim for fitting said hood against a flat ceiling or wall having an orifice through which an air flow to be measured flows;

four longitudinally incompressible elongate struts for fitting inside said hood and erecting said hood by bearing at one end against said first frame near a corner thereof and bearing at the other end against said second frame, said struts being sufficiently flexible to permit said hood to be twisted to bring said first and second frames closer to each other for temporary transportation without demounting the hood and sufficiently stiff for firmly spacing said first and second frames apart and thereby stretching said hood in normal handling of said hood structure for making air flow measurements, and a web for stretching between two of said struts bearing against opposite corners of said first frame and connected at its ends respectively to said struts, for providing an anti-swirl barrier extending across the interior of said hood.

2. Hood structure according to claim 1, in which said segments of said second frame are composed of eight segments of equal size disposed in said ring in connected pairs, the pairs being separated from each other in each case by a segment of smaller size, said segments of smaller size being four in number, of equal size, and of a length, between centers of those of said joints which connect a said segment of smaller size to other segments, which length is between 25% and 50% of the length of one of said eight segments of equal size.

3. Hood structure according to claim 2, in which said four segments of smaller size are of the length, between pivot joint centers which is about 40% of the length of one of said eight segments of equal size.

4. Hood structure according to claim 1, in which said second frame has seven pairs of opposite equal segments connected in a ring by tightenable pivot joints, said ring of segments containing eight segments of equal size disposed in connected pairs, said pairs being in each case separated by a te least one segment of smaller size, said segments of smaller size comprising two segments of equal size oppositely located in said ring and of a length which is between 25% and 50% of the length of one of said eight segments of equal size and of four segments of half the length of said length of one of said two segments of smaller size, and disposed in connected pairs oppositely located in said ring.

5. Hood structure according to claim 4, in which said two segments of a length which is between 25% and 50% of the length of one of said eight segments of equal size are of a length which is about 40% of the length of one of said eight segments of equal size.

6. Hood structure according to claim 1, in which said segments of said second frame are angle bar segments each having first and second flanges at right angles to each other, said segments being hinged to each other in a ring so that said first flange of each angle bar segment lies in the same plane as said first flange of every other angle bar segment of said ring while said second flange of each of said angle bar segments is hinged at each end to second flanges of other segments to provide said pivot joints, said first flanges of said segments extending inwards of said ring and having oblique end edges for defining the smallest closing angle to which adjacent segments can be closed by pivoting on said pivot joints, said pivot joints being tightenable by adjustable braces respectively provided for all those pivot joints of said segments for which said oblique flange edges limit the closing angles of the pivot joint to an angle not substantially less than 90°, while any pivot joints for which the closing angles are not so limited, being not more than two of said pivot joints, are fixable in angle as the result of tightening of the remaining pivot joints by said adjustable braces.

7. Hood structure according to claim 6 in which each said tightenable adjustable brace comprises a flat strip pivoted at one end on the flange of a first segment of a pair of adjacent segments including a second segment, which flange is in said common plane, and releasable clamping means mounted on a flange of said second segment for releasably clamping said flat strip in an adjustable fixed position relative to said second segment.

8. Hood-structure according to claim 6 wherein said pivot joints connecting said angle bar segments by virtue of said segments being hinged to each other are tightenable by means of braces each comprising:

a flat strip pivoted at one end on a said first flange of a first angle bar segment of a pair of adjacent angle bar segments including a second angle bar segment, and releasable clamping means mounted on a flange of said second angle bar segment for releasably clamping said flat strip in a selectable fixed position relative to said second angle bar segment.

9. Hood structure according to claim 8, wherein said releasable clamping means are mounted on a said first flange of said second segment.

10. Convertible-shape rim for providing an orifice of adjustable shape for a hood or duct of flexible material, said orifice having a contour lying in a plane, comprising:

a multiplicity of angle bar segments each having two flanges at right angles to each other, said segments being hinged to each other in a ring so that a first flange of each angle bar segment having oblique end edges contributes to the contour of said orifice and lies in said plane of said orifice contour and so that a second flange of each angle bar segment is hinged at each end of said second flange to another of said segments, said first flanges of said segments extending inwards of said ring and having oblique end edges for defining the smallest closing angle to which adjacent segments can be closed;

tightenable, adjustable braces respectively provided for all pairs of said hinged segment ends which are hinged to each other, for which said oblique flange edges limit the closing angle of said junction to an angle not substantially less than 90°, each said brace comprising:

a flat strip pivoted at one end on a said first flange of a first segment of a pair of adjacent segments including a second segment, and releasable clamping means mounted on a flange of said second segment for releasably clamping said flat strip in a selectable fixed position relative to said second segment.

11. Convertible-shape rim according to claim 10 in which all said pairs of said hinged segment ends which ar hinged to each other have oblique end edges of said first flanges of said segments which limit the respective closing angles of said hinged segment ends to angles which in no case are substantially less than 90°.

12. Convertible-shape rim according to claim 11 wherein said angle bar segments hinged to each other in a ring comprise eight segments of equal size disposed in said ring in connected pairs, the pairs being separated from each other in each case by a segment of smaller size, said segments of smaller size being four in number, of equal size, and of a length between said hinged junctions which is between 25% and 50% of the length of one of said eight segments of equal size.

13. Convertible-shape rim according to claim 12 in which said four segments of smaller size are of a length, between pairs of hinged segment ends, which is about 40% of the length of one of said eight segments of equal size.

14. Convertible-shape rim according to claim 10 in which two pairs of hinged segment ends, oppositely located in said rim, have oblique end edges of said first flanges which limit the respective closing angles of said two pairs of segment ends to substantially equal angles which are considerably less than 90°, while the remaining pairs of hinged segment ends have oblique end edges of said first flanges which limit the respective closing angles of said pairs of segment ends to an angle no substantially less than 90°.

15. Convertible-shape rim according to claim 14 in which said angle bar segments hinged to each other in a ring comprise eight segments of equal size disposed in connected pairs, said pairs being in each case separated by at least one segment of smaller size, said segments of smaller size comprising two segments of equal size oppositely located in said ring and of a length which is between 25% and 50% of the length of one said eight segments of equal size and of four segments of half the length of said length of one of said two segments of smaller size and disposed in connected pairs oppositely located in said ring, the connection between said connected pairs of smallest size segments being said hinged segment ends which have oblique flange end edges which limit the closing angles of said junctions to angles which are considerably less than 90°.

16. Convertible-shape rim according to claim 15 in which said two segments of smaller size having a length between 25% and 50% of one of said eight segments of equal size are of a length which is about 40% of the length of one of said eight segments of equal size.

17. Hood structure according to claim 16 comprising a pair of clips oppositely located on said ring of angle bar segments of said second frame and mounted in each case on a side of a said first flange of a said segment, which side of said first flange faces away from said first frame, said clips including a first clip having an upper clip portion and a hinge lying along and close to the free edge of said first flange, said free edge being an edge parallel to the junction of said first flange with a said second flange of the same segment, and a second clip having a hinge in the neighborhood of an edge of a said angle bar segment formed by junction of its first and second flanges, said hood structure also comprising means for selectively erecting said clips by bringing said upper clip portion parallel to said inwardly extending first flanges of said angle bar segments and likewise for bringing down said upper clip portion of said clips, said upper clip portion of said first clip being disposed for being brought down within said hood structure and said upper clip portion of said second clip being disposed for being brought down outside of said hood structure.

18. Convertible-shape rim according to claim 10, wherein said releasable clamping means are mounted on a said first flange of said second segment.

19. Convertible-shape rim according to claim 18, wherein said flat strip is formed with a longitudinal slot therein having one end near the end of said strip opposite the said end at which it is pivoted, and wherein said releasable clamping means includes a member passing through said slot and through a hole provided in said first flange of said second angle bar segment.

20. Convertible-shape rim according to claim 18, wherein all said pairs of said hinged segments ends which are hinged to each other have olbique edges of said first flanges of said segments which limit the respective closing angles of said hinged segment ends to angles which in no case are substantially less than 90°.

* * * * *